United States Patent [19]

Conrad et al.

[11] 4,021,504

[45] May 3, 1977

[54] THERMOSETTING COATING COMPOSITION OF ACRYLIC INTERPOLYMERS

[75] Inventors: Daniel T. Conrad, Cuyahoga Falls; William C. Mast, Stow; Tom M. Wathen, Akron, all of Ohio

[73] Assignee: The Goodyear Tire & Rubber Company, Akron, Ohio

[22] Filed: May 5, 1975

[21] Appl. No.: 574,800

Related U.S. Application Data

[63] Continuation of Ser. No. 412,215, Nov. 2, 1973, abandoned.

[52] U.S. Cl. .................... 260/836; 260/837 R; 260/32.8 EP; 427/27; 526/317
[51] Int. Cl.² ................ C08L 25/14; C08L 33/02
[58] Field of Search ............. 260/836, 837 R, 80.8, 260/78.5 R; 526/317

[56] References Cited

UNITED STATES PATENTS

| | | | |
|---|---|---|---|
| 3,014,881 | 12/1961 | La Barre | 260/18 |
| 3,305,601 | 2/1967 | Hicks | 260/837 |
| 3,330,814 | 7/1967 | Vasta | 260/88.1 |
| 3,338,860 | 8/1967 | Vasta | 260/33.4 |
| 3,539,660 | 11/1970 | Hicks et al. | 260/837 |
| 3,551,517 | 12/1970 | Dowbenito et al. | 260/834 |
| 3,652,723 | 3/1972 | Fellers et al. | 260/836 |
| 3,678,131 | 7/1972 | Klapprott et al. | 260/837 R |
| 3,758,633 | 9/1973 | Labana et al. | 260/836 |

*Primary Examiner*—Stanford M. Levin
*Attorney, Agent, or Firm*—F. W. Brunner; J. M. Wallace, Jr.

[57] ABSTRACT

Thermosetting powder coating compositions comprising (A) a carboxyl functional thermosetting acrylic interpolymer prepared by the polymerization of a monomeric mixture comprised of (1) a vinyl aromatic hydrocarbon, (2) a methacrylic acid ester, (3) an acrylic acid ester and (4) an olefinically unsaturated carboxylic acid and (B) at least one curing agent selected from the group consisting of di- and multifunctional epoxides.

11 Claims, No Drawings

THERMOSETTING COATING COMPOSITION OF ACRYLIC INTERPOLYMERS

This application is a continuation of our application Ser. No. 412,215, now abandoned filed Nov. 2, 1973.

This invention relates to novel powder coating compositions useful in electrostatic spray and fluidized bed powder processes. More particularly the invention relates to novel powder coating compositions comprising carboxyl functional thermosetting acrylic interpolymers and at least one curing agent selected from the group consisting of di- and multifunctional epoxides.

Fluidized bed and, in more recent years, electrostatic spray processes have received wide acceptance as a means for depositing various powder coating compositions to a variety of articles. One advantage of these processes has been due to their ability to achieve more uniform coatings of controlled thickness than has heretofore been possible with more conventional coating techniques such as brush, spray, or roller coating. Another advantage of this process is the elimination of the need for solvents and their attendant economic and ecological disadvantages. The fluidized bed process is essentially a dipping process wherein the article to be coated is dipped or otherwise introduced into a fluidized bed of solid resin particles which are set in fluid motion by an intrained flow of gas. The article to be coated is preheated to a temperature above the melting point of the resin and then immersed into the fluidized mass of resin powder. When the resin particles contact the heated article the particles melt and adhere to the preheated article surface. Electrostatic coating methods generally comprise applying an electrical charge to the particles of the coating composition and spraying said electrically charged particles onto the surface of the grounded work piece. The coated article is then heated to fuse the coating to the article and provide a smooth coating. In the case of thermosetting coating compositions the heating stage also serves to cure the coating material.

Various coating compositions intended for use in fluidized bed and electrostatic spray processes have been suggested heretofore. And of the useful thermosetting polymeric materials the resinous polymeric epoxides, prepared by the reaction of a polyhydric phenol and an epihalohydrin in an alkaline medium, have been the most widely available and used coating material. By the term "thermosetting polymeric material" is meant polymeric materials which require some type of curing or hardening in order to obtain the requisite hardness, elasticity or other desired characteristics and are distinguishable from thermoplastic materials in that once the thermosetting polymer has taken shape in a cured state it cannot be reformed by simple melting and remolding. However, the use of the resinous polymeric epoxides has not been entirely satisfactory in that these polymers lack good weather and aging resistance which has limited their field of application and usefulness. Other resins such as the thermosetting polyesters and acrylics for use in powder coating applications are commercially available which exhibit superior aging resistance over that of the epoxy resins but suffer from the inability to provide good surface smoothness and edge coverage. Thus the need for thermosetting powder coatings possessing good weathering, aging, surface smoothness and edge covering characteristics as well as good gloss, toughness, hardness and flexibility is well recognized in the industry and one which the carboxyl functional thermosetting acrylic interpolymer based powder coating compositions of this invention fulfills.

Accordingly, the present invention relates to powder coating compositions comprising (A) at least one carboxyl functional thermosetting acrylic interpolymer having a second order transition temperature ranging from 30° to 80° C. prepared by the polymerization of a monomeric mixture comprised of (1) from 0 to 50 percent by weight of a vinyl aromatic hydrocarbon, (2) from 20 to 88 percent by weight of a methacrylic acid ester, (3) from 10 to 40 percent by weight of an acrylic acid ester and (4) from 2 to 20 percent by weight of an olefinically unsaturated carboxylic acid, all percentages based on the total weight of monomers charged and (B) at least one curing agent selected from the group consisting of di- and multifunctional epoxides wherein component (A) ranges from 50 to 92 percent by weight and component (B) ranges from 50 to 8 percent by weight, all based on the total combined weight of components (A) and (B). The invention also relates to the carboxyl functional thermosetting acrylic interpolymers useful in the preparation of the powder coating compositions described hereinabove.

The monomeric materials which are employed in the preparation of the thermosetting acrylic interpolymers comprising the (A) component of the powder coating compositions of this invention are selected from four distinct classes of compounds. These four distinct classes include the vinyl aromatic hydrocarbons, the methacrylic acid esters, the acrylic acid esters and the olefinically unsaturated carboxylic acids containing from 1 to 3 carboxyl groups. The amount of each monomer employed in preparing the thermosetting acrylic interpolymer is selected such that when the interpolymer is blended with the curing agents described hereinbelow and cured to form a coating, said coating will exhibit excellent gloss, surface smoothness, edge coverage, toughness, hardness, and flexibility and improved aging and chemical resistance. Satisfactory coatings have been otained employing thermosetting acrylic interpolymers characterized by having been prepared from monomeric reaction mixtures comprised of from 0 to 50 percent by weight of the vinyl aromatic hydrocarbon, from 20 to 88 percent by weight of the methacrylic acid ester, from 10 to 40 percent by weight of the acrylic acid ester and from 2 to 20 percent by weight of the olefinically unsaturated carboxylic acid. More preferred monomeric mixtures for preparing the thermosetting acrylic interpolymers are those comprised of from 0 to 40 percent by weight of the vinyl aromatic hydrocarbon, from 30 to 79 percent by weight of the methacrylic acid ester, from 15 to 40 percent by weight of the acrylic acid ester and from 6 to 12 percent by weight of the olefinically unsaturated caboxylic acid. Coatings which have exhibited the best gloss, surface smoothness, edge coverage, toughness, hardness, flexibility and improved aging and chemical resistance have been those coatings in which the carboxyl functional thermosetting acrylic interpolymer components were prepared from monomeric mixtures comprised of from 18 to 37 percent by weight of the vinyl aromatic hydrocarbon, from 30 to 56 percent by weight of the methacrylic acid ester, from 20 to 40 percent by weight of the acrylic acid ester and from 6 to 12 percent by weight of the olefinically unsaturated carboxylic acid. The thermosetting acrylic interpolymers described above are further characterized by second order transition temperatures (Tg) ranging from 30° to 80° C., which assures that the interpolymers and the powder coating compositions prepared therefrom will remain as discrete powders over long storage periods. The preferred coating compositions of this invention are those in which the interpolymer component possesses a second order transition temperature ranging from 45° to 70° C.

Representative examples of compounds falling within the four classes of monomeric materials useful in the preparation of the interpolymer component of the powder coating for compositions include vinyl aromatic hydrocarbons such as styrene, α-methylstyrene, methylstyrene, ethylstyrene, 2,4-dimethylstyrene, butylstyrene, t-butyl-styrene, isobutylstyrene, phenylstyrene, cyclohexylstyrene and the like; methacrylic acid esters such as the alkyl esters, including methyl methacrylate, ethyl methacrylate, isopropyl methacrylate, isobutyl methacrylate, t-butyl methacrylate, butyl methacrylate, isodecyl methacrylate and the like; aryl and cycloalkyl esters including phenyl methacrylate, cyclohexyl methacrylate, 3,3,5-trimethyl-cyclohexyl methacrylate and the like and etherate esters such as ethoxyethyl methacrylate and the like; acrylic acid esters such as the alkyl esters including methyl acrylate, ethyl acrylate, n-butyl acrylate, isobutyl acrylate, amyl acrylate and the like; the cycloalkyl and aryl esters including cyclohexyl acrylate, phenyl acrylate and the like; and the etherate esters such as 2-methoxyethyl acrylate, 2-ethoxyethyl acrylate and the like and olefinically unsaturated carboxylic acids containing 1 to 3 carboxyl groups such as acrylic acid, methacrylic acid, fumaric acid, maleic acid, methyl maleic acid, methyl fumaric acid, ethyl maleic acid, itaconic acid (methylene succinic acid), aconitic acid (propene-1,2,3-tricarboxylic acid) and the like. Generally the monomeric reaction mixture will contain only one member from each of the four classes of monomers. However, more than one member from each of the four classes of monomers may be employed. Of the interpolymers useful in preparing the herein described powder coating compositions those prepared from monomeric reaction mixtures of styrene, methyl methacrylate, butyl acrylate and methacrylate acid are preferred.

The polymerization of the above monomeric mixtures may be effected by any number of well known polymerization methods, including bulk, nonaqueous dispersion, solution, suspension and emulsion polymerization methods. It is most preferred, however, to carry out the polymerization of the monomeric mixture in an aqueous emulsion in the presence of an emulsifying agent, initiator and a chain transfer agent or modifier for regulating the molecular weight of the acrylic interpolymer.

Examples of suitable initiators useful in any of the above polymerization methods include benzoyl peroxide, lauroyl peroxide, diethyl peroxide, dipropyl peroxide, cumene hydroperoxide, hydrogen peroxide, tert.-butyl hydroperoxide, sodium, potassium and ammonium persulfate, azobisisobutyronitrile, diazoaminobenzene and the like. Those initiators which are hydrocarbon soluble are, of course, preferred in the bulk and solution polymerization methods while those soluble in water are preferred in the suspension and emulsion polymerization methods. Particular advantageous water soluble initiators include hydrogen persulfate and sodium, potassium or ammonium persulfate employed alone or in an activated redox system. Generally the amount of initiator employed can range from 0.05 to 5.0 percent by weight based on the total weight of the monomeric mixture to be polymerized and preferably from 0.1 to 0.3 percent by weight.

Suitable emulsifying agents which can be employed in the emulsion polymerization method include anionic emulsifiers such as the high molecular weight aliphatic sulfates such as sodium lauryl sulfate; alkaryl sulfonates such as sodium isopropyl naphthalene sulfonate, sodium dodecyl benzene sulfonate; phosphate esters such as sodium or potassium phosphate esters and nonionic emulsifiers such as polyethoxylated compounds, for example, octyl and nonylphenoxy-polyethoxy-ethanol. The emulsifiers may be charged completely at the outset of the polymerization or a portion charged at the outset and additional emulsifier proportioned or added in increments throughout the polymerization. The amount of emulsifying agent employed can range from 0.5 to 8.0 percent by weight based on the total weight of monomers charged and preferably from 1.0 to 4.0 percent by weight. Mixtures of the above described emulsifiers can also be employed.

In addition, it is also desirable to use a chain transfer agent or modifier to regulate the molecular weight of the products. Effective chain transfer agents include linear aliphatic mercaptans such as n-dodecyl mercaptan, or branched aliphatic mercaptans such as t-dodecyl mercaptans or mixtures of mercaptans such as t-dodecyl mercaptan with other mercaptans having from 8 to 14 carbon atoms. Only small amounts of such mercaptans or mixtures of mercaptans, for example from 0.01 to 5.0 percent by weight based on the total weight of monomers charged, are required.

In the polymerization of the monomeric mixtures of this invention the reaction temperatures can range from as low as −10° to as high as 100° C. or higher. However, most satisfactory results are achieved using reaction temperatures in the range of from 20° to 80° C. In emulsion polymerization systems it is possible to obtain quantitative yields of polymer in about 2 to 12 hours. The resulting latex is then coagulated in the usual manner employing a di- or polyvalent electrolyte such as magnesium sulfate, aluminum sulfate, calcium chloride and the like and dried to produce discrete powdered resin.

The multifunctional curing agents which comprise the (B) component of the powder coating compositions of this invention are selected from the class consisting of di- and multifunctional epoxides. Useful epoxides are those epoxy resins characterized by containing more than one 1,2-epoxy group, which is graphically represented by

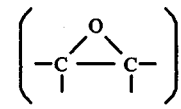

per average molecular weight of epoxy resin. Epoxy resins are well known and generally fall into the following two broad categories: (1) Those epoxy resins derived from the reaction of epichlorohydrin or an equivalent 1,2-epoxy compound thereof with a polyhydric phenol or other polyhydric compound and (2) those epoxy resins derived from the epoxidation of polyolefins and other unsaturated compounds such as unsaturated oils and cyclic dienes with peracids.

The most common epoxy resins within category (1) above are those in which the polyhydric phenol is bisphenol A, [2,2-bis(p-hydroxyphenyl)propane] and are known as diglycidyl ether bisphenol A epoxy resins of the general formula

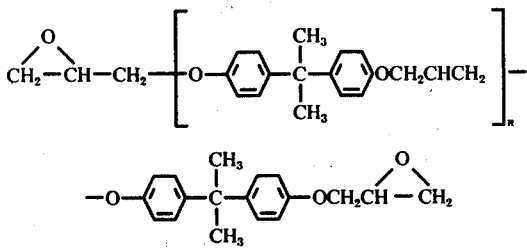

wherein n is an integer ranging from 0 to 12. These resins are produced commercially in a wide variety of average molecular weights, epoxide equivalent weights, viscosities, softening points and the like. In addition, various derivatives of bisphenol A, wherein halogens, alkyl, hydroxyl or hydroxyalkyl groups have been substituted upon the aromatic ring, have been used to produce modified diglycidyl ether bisphenol A epoxy resins which are also useful in preparing the powder coating composition of this invention. Other useful, commercially available diglycidyl ether epoxy resins which can be prepared by the first process are those prepared from other polyhydric compounds such as glycerol, polyglycols, novalac resins or other polynuclear polyhydroxy phenols such as bisphenol F, [bis(p-hydroxyphenol) methane] and the like. Preferred examples of useful di- and multifunctional epoxide curing agents include the solid diglycidyl ether bisphenol A epoxides which have average molecular weights ranging from 700 to 2000, epoxide equivalent weights ranging from 450 to 1000 and Durran's softening points ranging from 65° to 105° C.

The second general types of epoxies, that is, those produced by epoxidation, include polyepoxides of olefins, cycloolefins and other unsaturated compounds such as oils and cyclic dienes. Of these types of epoxides those derived from cycloaliphatic compounds are the most preferred. Representative but not limiting examples of such materials include vinyl cyclohexene dioxide having the structural formula

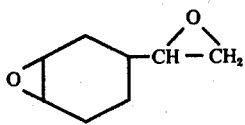

and bis(3,4-epoxy-6-methylcyclohexyl methyl) adipate having the structural formula

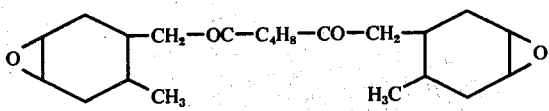

Both of these materials are commercially available from the Union Carbide Corporation. This latter material has an epoxide equivalent range of from 205 to 216. However, this cycloaliphatic epoxide is a liquid and cannot be used as the sole curing agent since quantities of this epoxide sufficient to bring about a satisfactory cure lowers the softening point of the powder composition to a level where the composition will not retain its powdery nature. Therefore useful cycloaliphatic epoxides which are liquid in form are employed in combination with solid epoxides.

The above described epoxides comprising the second or (B) component of the powder coating compositions of the present invention are representative of but not all inclusive of the types which may be utilized. In addition to the mixtures of liquid and solid epoxides other mixtures of the above described epoxides can also be employed to produce powder coating compositions with superior properties when thermoset or cured in place on the surface of the article to be coated.

The amount of epoxide curing agent used depends upon the functional equivalent weight of the particular epoxide or combination of epoxides chosen. In general the amount of epoxide curing agent employed will range from 8 to 50 percent by weight of the total weight of the combined acrylic interpolymer and epoxide curing agent.

A novel and useful feature of the epoxide curing agents employed in the present invention is that their reaction with the carboxyl functional groups of the thermosetting acrylic interpolymer forms ester linkages with no by-product formation. This is important in the processing of coatings because by-product formation is often detrimental to film properties by creating a condition of porosity through escape of the by-product or may result in water or solvent sensitivity by retention of a monomeric by-product within the coating film.

Various cure accelerators can also be incorporated in small amounts into the coating composition. Generally, effective concentrations of known cure accelerators bring about some degree of premature reaction during the melt compounding process. They can be incorporated by various means onto the pulverized coating as a finishing step. Accelerators for the types of reactions taking place between the curing agents and the thermosetting acrylic interpolymers herein described are known to those skilled in the art and may be typified by benzyldimethylamine, ethyldiethanolamine, 2-ethyl-4-methylimidazole, boron trifluoride monoethylamine complex, dicyandiamide, stannous octoate, p-toluene sulfonic acid and the like. There are patented "latent" promoters which may also be incorporated into the compound during the melt mixing without detrimental effect and become active at high temperatures of cure.

When desired, various additives such as fillers, pigments and other materials can be incorporated into the composition to regulate flow, impart color or obtain other modified properties as imparted to the powder coating composition by such additives. Other materials which can also be added in small quantities to the powder coating compositions include leveling agents, organic optical brighteners and antibacterial and antifungicidal agents.

The powder coating compositions of the present invention can be prepared by various dry blending techniques or by melt mixing followed by pulverization. Melt mixing is preferred because it produces a powder with individual particles of homogeneous composition which greatly aids application of the powders and produces coatings of superior properties. Techniques for producing melt mixed powder coating compositions may be divided into two basic types, batch process and continuous process.

In the batch process the various ingredients are charged to a cooled sigma blade mixer, stirred for a short time and then fluxed at temperatures from 82° to 130° C. by the shear and pressure forces within the mixer. After complete fluxing and dispersion of inert ingredients the plastic mass is removed from the mixer and sheeted out on an open mill to facilitate cooling. The composition is then air cooled or water quenched to room temperature, ground to intermediate particle size chips, pulverized to powder and screened to provide the coating powder of desired particle size.

For a continuous process all ingredients are blended together in either a ball mill, drum mixer, high intensity mixer, twin shell, rotary cone or ribbon blender until a uniform dispersion of solids is attained. The above mixture is then fed into a preheated continuous mixing device such as an extruder or compounding extruder of the twin screw or reciprocating screw design, wherein the resinous materials melt and pigments, fillers and other inert ingredients are dispersed in this melt to obtain the desired homogeneous composition. Dwell times and temperatures (between 82° and 130° C.) are controlled to completely flux the resinous ingredients and achieve complete mixing without appreciably advancing the potential reaction between the reactive ingredients. When complete homogeneity is achieved the composition is cooled by thickness reduction by passing the material through cooling rolls or a pelletizer for better exposure to the cooling medium and reduced in size via a flakeoff belt, dicer or granulator to transform the composition into a particle size suitable to be fed into a grinding mill or pulverizer where it is ground into the desired particle size and classified as to specific particle size distribution range. Optimum particle size range for fluid bed coating is 75 to 200 microns while optimum size for electrostatic spray application is 74 or less microns. The final powder is sieved through a 200 mesh U.S. Standard (74 microns) screen for electrostatic spray application and packaged.

The invention is further described in the following examples. All parts and percentages in the examples and throughout the specification are by weight unless otherwise stated. The "Pillow Flow Test" referred to in the following examples is a test procedure employed in the art to determine whether a particular powder coating composition has the proper balance of melt flow and cure rate properties to provide coatings having good surface smoothness and edge covering ability. The Pill Flow Test consists of compacting the powder coating composition into a 1½ inch diameter pellet of constant volume at room temperature. The pellet is then adhered to a preheated steel test panel and mounted in an oven at a 45° angle. The times and temperatures employed in the test are the same as those required for the curing of a coating of the powder coating composition. During oven exposure the pellet melts and flows down the panel until the curing reaction proceeds to the point where the flow ceases. The Pill Flow Test value is measured as the distance of flow down the panel minus the original diameter of the pellet. The powder coating compositions of the present invention which give coatings having excellent surface smoothness and edge coverage exhibit Pill Flow Test values of from 2 to 6 inches when heated at 193° C. for a period of 20 minutes.

EXAMPLE 1

To a suitable emulsion reactor, capable of maintaining controlled temperature and agitation, the following ingredients were charged at room temperature.

|  | Parts |
|---|---|
| Water (deionized) | 200.0 |
| Organic phosphate ester surfactant | 3.71 |
| Potassium hydroxide | 0.29 |
| Potassium persulfate | 0.20 |
| Styrene | 37.0 |
| Methyl methacrylate | 30.0 |
| Butyl acrylate | 25.0 |
| Methacrylic acid | 8.0 |
| Mercaptan modifier | 1.5 |

After the reaction vessel had been purged with nitrogen the temperature was raised to 50° C. and maintained there for six to eight hours under a nitrogen atmosphere to complete the polymerization. The polymer was isolated from its latex by coagulation with a polyvalent electrolyte solution, washed and dried. This resin is characterized by a Tg value to 70° C. and an intrinsic viscosity value of 0.21 in methyl ethyl ketone (MEK) solvent as measured at 30° C.

EXAMPLE 2

Seven interpolymers were prepared and isolated in accordance with the procedure set forth in Example 1 except that the amounts, in parts, of the various monomers were varied as follows:

|  | Resin No. | | | | | | |
|---|---|---|---|---|---|---|---|
|  | 2A | 2B | 2C | 2D | 2E | 2F | 2G |
| Styrene | 27 | 18 | 18 | 33 | 27 | 0 | 40 |
| Methyl methacrylate | 34 | 34 | 32 | 30 | 34 | 57 | 30 |
| Butyl acrylate | 31 | 40 | 40 | 25 | 31 | 35 | 20 |
| Methacrylic acid | 8 | 8 | 10 | 12 | 4 | 8 | 10 |
| Acrylic acid | 0 | 0 | 0 | 0 | 4 | 0 | 0 |
| Tg (° C.) | 63 | 47 | 49 | 73 | 58 | 55 | 79 |
| Intrinsic Viscosity 30° C. in MEK | 0.20 | 0.22 | 0.22 | 0.12 | 0.19 | 0.32 | 0.16 |

EXAMPLE 3

A pigmented powder coating composition was then prepared as follows: sixty nine parts by weight of the acrylic interpolymer of Eample 1, 31 parts by weight of DER 661, a solid diglycidyl ether bisphenol A (DGEBA) type epoxy resin commercially available from Dow Chemical Company and characterized by an epoxide equivalent weight (EEW) ranging from 475 to 575 and a Durran's softening point ranging from 70° to 80° C. and 50 parts by weight of titanium dioxide powder were placed in a cold Banbury type mixer and mixed until the resins became plastic and the pigment was thoroughly dispersed throughout the resin. During the mixing period of about four minutes the temperature of the resin batch was controlled by passing cold water through the cooling jacket and rotors of the mixer so that it ranged from room temperature at the beginning of the mixing cycle to about 110° C. at discharge. When the homogeneous composition was discharged it was immediately formed into a ¼ inch thick sheet by passing it through a two roll mill to facilitate cooling.

When the composition reached ambient temperature pieces of the compound were passed into a grinding apparatus and ground to a size small enough to pass a ¼ inch screen. These particles of compounded resin were then pulverized to a particle size of less than 200 mesh U.S. Standard screen in a powder grinder machine. The powdered composition gave a Pill Flow Test value of 2¼ inches.

This powder coating composition prepared above was then applied to cleaned, room temperature steel panels by spraying through a commercial electrostatic powder spray gun. The panels were baked at 193° C. for 30 minutes and air cooled. The resultant coatings had excellent surface uniformity and smoothness, gloss, hardness, adhesion and very good toughness and chemical resistance. This coating exhibits exceptionally good edge coverage.

EXAMPLE 4

Sixty nine parts by weight of the acrylic interpolymer of Example 1, 31 parts by weight of the solid DGEBA type epoxy resin employed in Example 3 and 50 parts by weight of titanium dioxide powder were blended together until a uniform dispersion was attained in a high intensity type mixer. The blended mixture was then fed into a preheated twin screw type continuous mixer. The stock temperature was approximately 122° C. upon exit from the mixer and the dwell time within the mixer was calculated to be 40 seconds. The discharged composition was carried away on a cooling belt and when cooled to ambient temperature was ground to pass a ¼ inch screen and pulverized to a particle size of less than 200 mesh U.S. Standard screen. The screened powder particles were applied to cleaned, room temperature steel panels by electrostatic spray and baked as in Example 3. The resultant coatings had equivalent properties to those obtained in Example 3.

EXAMPLE 5

Eighty six parts by weight of the acrylic interpolymer of Example 1 and 14 parts by weight of DER 331 a liquid DGEBA type epoxide commercially available from the Dow Chemical Company and characterized by an EEW of 182 to 190 and a viscosity of 11,000 to 14,000 centapoises (cps) at 25° C. were fusion mixed as in Example 3. When removed from the mixer and cooled to room temperature this compound was a solid which was ground and pulverized into a coating powder passing a 200 mesh U.S. Standard screen. This powder gave a Pill Flow Test value of 6½ inches and when electrostatically sprayed upon steel panels and baked at 193° C. for 30 minutes provided coatings having excellent hardness, surface smoothness, gloss and adhesion but only fair edge coverage. While this powder coating compound can be produced and utilized, upon storage at room temperature the powder particles begin to agglomerate or "sinter" within days, rendering the powder unusable. This example illustrates the detrimental effects that significant quantities of a useful liquid epoxide in the powder coating composition will have on the ability of said coating composition to remain a discrete powder over extended periods of time and to provide good edge coverage when applied to the article to be coated. The example further supports the teachings hereinabove that when liquid epoxides are employed as curing agents they are most advantageously employed in combination with a solid epoxide.

EXAMPLE 6

Sixty nine parts by weight of the acrylic interpolymer, Resin No. 2A of Example 2, 31 parts by weight of the solid DGEBA type epoxy resin employed in Example 3 and 50 parts by weight of titanium dioxide powder were fusion mixed, ground and pulverized as in Example 3. This powder gave a Pill Flow Test value of 2⅞ inches. When the powder was applied to steel panels and cured as in Example 3 coatings with excellent surface uniformity and smoothness, gloss, hardness, adhesion and toughness and chemical resistance were obtained.

EXAMPLE 7

Sixty nine parts by weight of the acrylic interpolymer, Resin No. 2B of Example 2, 31 parts by weight of the solid DGEBA type epoxy resin employed in Example 3 and 50 parts by weight of titanium dioxide powder were fusion mixed, ground and pulverized as in Example 3. This powder gave a Pill Flow Test value of 3⅛ inches and when applied to steel panels as in Example 3 gave coatings of equivalent properties to those obtained in Example 6. Upon storage at room temperature the powder particles did not begin to agglomerate or sinter until after the passage of several weeks. It is preferred to utilize curing components with elevated softening points in combination with the lower softening acrylic interpolymers such as Resin Nos. 2B and 2C of Example 2.

EXAMPLE 8

Sixty nine parts by weight of the acrylic interpolymer of Example 1, 31 parts by weight of the solid DGEBA type epoxy resin employed in Example 3, 30 parts by weight of titanium dioxide powder, 42 parts by weight of calcium carbonate powder, 0.62 part by weight of carbon black and 3.25 parts cadmium based yellow pigment were fusion mixed, ground and pulverized as in Example 3. This powder gave a Pill Flow Test value of 2⅛ inches and when applied to steel panels as in Example 3 gave coatings with excellent surface uniformity and smoothness, edge coverage, hardness and adhesion with very good toughness and chemical resistance. The gloss of this coating is reduced to a desired level through incorporation of the calcium carbonate filler pigment.

While certain representative embodiments and details have been shown for the purpose of illustrating the invention it will be apparent to those skilled in this art that various changes and modifications may be made therein without departing from the spirit or scope of the invention.

What is claimed is:

1. Thermosetting powder coating compositions consisting of (A) at least one carboxyl functional thermosetting acrylic interpolymer having a second order transition temperature ranging from 30° to 80° C. and prepared by the polymerization in the presence of a chain transfer agent at a temperature in the range of about −10° C. to about 100° C. of a monomeric mixture consisting of (1) from 0 to 50 percent by weight of a vinyl aromatic hydrocarbon, (2) from 20 to 88 percent by weight of a methacrylic acid ester, (3) from 10 to 40 percent by weight of an acrylic acid ester and (4) from 2 to 20 percent by weight of an olefinically unsaturated carboxylic acid containing from 1 to 3 carboxyl groups selected from the group consisting of acrylic acid, methacrylic acid, fumaric acid, maleic acid, methyl maleic acid, methyl fumaric acid, ethyl maleic acid and itaconic acid propene-1,2,3-tricarboxylic acid, all percentages based on the total weight of monomers charged and (B) at least one curing agent selected from the group consisting of di- and multifunctional epoxides derived from the reaction of epichlorohydrin or glycidyl ether with a polyhydric phenol or a polyhydric compound selected from the group consisting of glycerol, polyglycols, novalac resins and polynuclear polyhydroxy phenols and polyepoxides of olefins, cycloolefins and cyclic dienes, and wherein component (A) ranges from 50 to 92 percent by weight and component (B) ranges from 50 to 8 percent by weight all based on total combined weight of components (A) and (B).

2. Thermosetting powder coating compositions according to claim 1 wherein the carboxyl functional thermosetting acrylic interpolymer has a second order transition temperature ranging from 30° to 80° C. and is prepared by emulsion polymerization of a monomeric mixture of (1) from 0 to 40 percent by weight of a vinyl aromatic hydrocarbon, (2) from 30 to 60 percent by weight of a methacrylic acid ester, (3) from 15 to 40 percent of an acrylic acid ester and (4) from 6 to 12 percent by weight of an olefinically unsaturated carboxylic acid containing from 1 to 3 carboxyl groups, all percentages based on the total weight of monomers charged and wherein the curing agent is selected from the group consisting of di- and multifunctional epoxides.

3. Thermosetting powder coating compositions according to claim 1 wherein the monomeric mixture employed to prepare the carboxyl functional thermosetting acrylic interpolymer, component (A) is (1) styrene, (2) methyl methacrylate, (3) butyl acrylate and (4) methacrylic acid.

4. Thermosetting powder coating compositions according to claim 1 wherein the carboxyl functional thermosetting acrylic interpolymer has a second order transition temperature ranging from 45° to 70° C. and is prepared by emulsion polymerization of a monomeric mixture of (1) from 18 to 37 percent by weight of a vinyl aromatic hydrocarbon, (2) from 30 to 56 percent by weight of a methacrylic acid ester, (3) from 20 to 40 percent by weight of an acrylic acid ester and (4) from 6 to 12 percent by weight of an olefinically unsaturated carboxylic acid containing from 1 to 3 carboxyl groups and wherein the curing agent is prepared by the reaction of epichlorohydrin or an equivalent 1,2-epoxy compound thereof with at least one compound selected from the group consisting of polyhydric phenols, glycerol, polyglycols, novalac resins and polynuclear polyhydroxy phenols.

5. Thermosetting powder coating compositions according to claim 4 wherein the epoxide has an average molecular weight ranging from 700 to 2000, an epoxide equivalent weight ranging from 450 to 1000 and a Durran's softening point ranging from 65° to 105° C.

6. Coatings of good surface uniformity, smoothness, gloss, hardness, adhesion, toughness, chemical resistance and good edge coverage consisting of
A. a carboxyl functional thermosetting acrylic interpolymer derived from the emulsion polymerization of a monomeric mixture consisting of
1. from 18 to 37 percent by weight of a vinyl aromatic hydrocarbon,
2. from 30 to 56 percent by weight of a methacrylic acid ester,
3. from 20 to 40 percent by weight of an acrylic acid ester and
4. from 6 to 12 percent by weight of an olefinically unsaturated carboxylic acid and containing from 1 to 3 carboxyl groups, wherein all percentages are based on the total weight of monomers charged and wherein said interpolymer has a second order transition temperature ranging from 45° to 70° C., and
B. at least one curing agent selected from the group consisting of di- and multi-functional epoxides derived from the reaction of epichlorohydrin or glycidyl ether with a polyhydric phenol or a polyhydric compound selected from the group consisting of glycerol, polyglycols, novalac resins and polynuclear polyhydroxy phenols and polyepoxides of olefins, cycloolefins and cyclic dienes, and
C. a pigment,
wherein (A) ranges from 50 to 92 percent by weight and (B) ranges from 50 to 8 percent by weight of the total combined weight of (A) and (B).

7. The coatings of claim 6 wherein the carboxyl functional thermosetting acrylic interpolymer, (A), is derived from the emulsion polymerization of a monomeric mixture of (1) styrene, (2) methyl methacrylate, (3) butyl acrylate and (4) methacrylic acid.

8. The coatings of claim 6 wherein the curing agent, (B), is selected from the group consisting of di- and multifunctional epoxides prepared by the reaction of epichlorohydrin with at least one compound selected from the group consisting of polyhydric phenols, glycerol, polyglycols, novalac resins and polynuclear polyhydroxy phenols.

9. The coatings of claim 8 wherein the curing agent, (B), is selected from the group consisting of di- and multifunctional epoxides prepared by the reaction of epichlorohydrin with a polyhydric phenol.

10. The coatings of claim 9 wherein the curing agent, (B), is selected from the group consisting of di- and multifunctional epoxides prepared by the reaction of epichlorohydrin and the polyhydric phenol, 2,2-bis(p-hydroxyphenyl) propane.

11. The coatings of claim 8 wherein the curing agent, (B), has an average molecular weight ranging from 700 to 2000, an epoxide equivalent weight ranging from 450 to 1000 and a Durran's softening point ranging from 65° C. to 105° C.

* * * * *